Oct. 5, 1971  J. M. DEJONGE  3,609,866
DEVICE FOR MAKING CHEDDAR AND SIMILAR CHEESE VARIETIES
Filed March 10, 1969  3 Sheets-Sheet 2

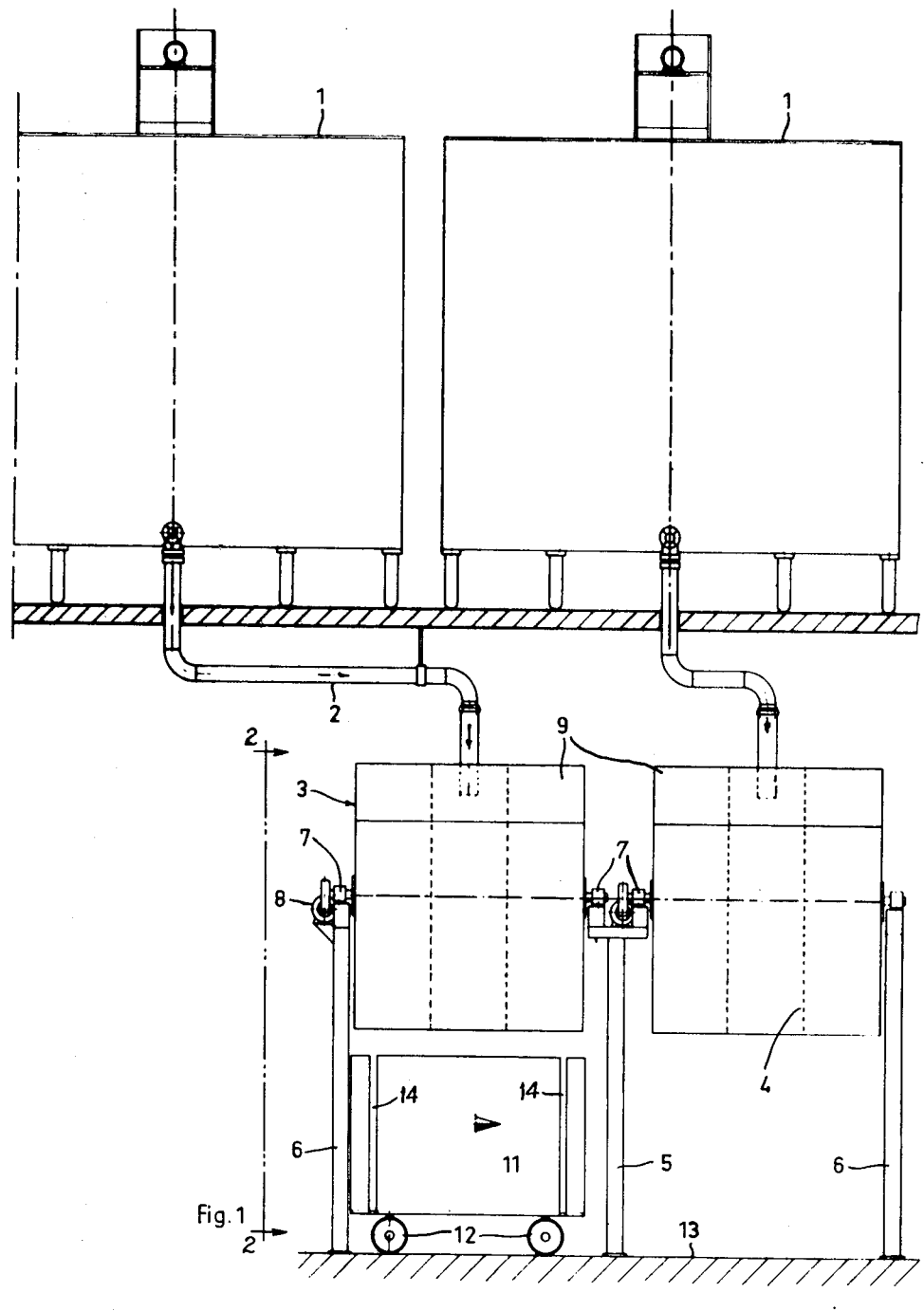

JOACHIM MAX de JONGE,
INVENTOR

BY Wendroth, Lind & Ponack,
ATTORNEYS

Oct. 5, 1971 J. M. DEJONGE 3,609,866
DEVICE FOR MAKING CHEDDAR AND SIMILAR CHEESE VARIETIES
Filed March 10, 1969 3 Sheets-Sheet 3

JOACHIM MAX de JONGE
*INVENTOR*

BY. Wenderoth, Lind & Ponack
*ATTORNEYs*

United States Patent Office 3,609,866
Patented Oct. 5, 1971

3,609,866
DEVICE FOR MAKING CHEDDAR AND SIMILAR CHEESE VARIETIES
Joachim Max de Jonge, Leeuwarden, Netherlands, assignor to Jongia Ingenieursbureau N.V., Leeuwarden, Netherlands
Filed Mar. 10, 1969, Ser. No. 805,651
Int. Cl. A01j 25/00, 25/11
U.S. Cl. 31—46
4 Claims

ABSTRACT OF THE DISCLOSURE

A process and apparatus whereby a whey-and-milk curd mixture is made in a first tank means and the curd is separated from the whey and cheddared in a different second tank means by an intermittant process whereby the second tank means is intermittently slowly rotated through approximately 90° about a raised, horizontal medial support axis for a predetermined period of time. The cheddared curds are then discharged onto a conveyor or into a conveying carriage adapted to move beneath said second tank, and having a raisable bottom which is subsequently lifted with the cheese pieces and cooperatively embodied at a combined agglomerating or compacting and grid-cutting or sizing station. This latter intermediate station has salt dosing or dispersion means operatively connected with the cutting operation whereby the salted and pre-sized pieces are collected and conveyed to a compartmented rotary mixing drum for further treatment. When this mixing treatment is completed, the processed cheese is discharged from the drum into adjoining weighing and molding apparatus to prepare predetermined size cheese blocks which are conveyed away for final disposition.

---

This invention relates to a device for making cheddar and similar cheese varieties, comprising a curds making section, tanks or the like for separating curds and whey, said tanks to be connected to said section, means for cutting the curds and mixing them with salt, a conveyor by means of which cut and salted curds can be led to a mixing drum and finally means by which the treated mass of curds is weighed out and filled into tanks.

The invention has for its object to provide a device of the type described above capable of being automatically operated in a quick and efficient manner and with a minimum of hands.

According to the invention this is accomplished in that the device for separating the curds and the whey can be automatically turned into various positions, conveying means being provided for leading the block of curds to a cutting device the action of which is coupled to the dosing of salt, which cutting device is directly connected to a conveyor, the latter opening into a mixing drum the outlet of which is connected to the means for controlling the treated mass of curds and for filling the tanks. The device for separating the curds and the whey preferably comprises at least one tank, hung up on pivots, at least one of which is drivable, said tank being provided at its upper end with an overflow trough which is separated from the tank space by a sieve plate whereas the tank is mounted at such a height from the ground that a transport carriage for receiving a block of curds from which the whey has been extracted can be moved into position under it.

An efficient construction is that in which the transport carriage for transporting a block of curds is formed with a loose bottom, the side walls being provided with grooves for receiving pins which serve for securing lifting means for the loose bottom.

In a preferred construction the cutting device may comprise a vessel formed with a loose bottom whereas inside said vessel a movable partition is disposed, said partition being coupled to a rod or plunger of a jack or the like disposed in a vertical wall whereas another wall, in the direction of which the partition is capable of moving, is carried out as a knife grid along which a movable knife is capable of shifting, said knife being coupled to the salt dosing means.

Furthermore the cutting device may be provided with lifting means for the loose bottom of the transport carriage said bottom fitting in the open lower side of the cutting device.

The knife which is movable along the knife grid may be efficiently coupled to one end of a two-armed lever, the other end of which is coupled to a rod capable of opening or closing a valve in the outlet of the salt dosing device.

The invention will be explained below with reference to the drawing in which:

FIG. 1 shows a portion of a device according to the invention in front view;

FIG. 2 a portion of FIG. 1, in side view;

FIGS. 3a and 3b are fragmentary cross-sectional and elevational views of the knife means shown in FIG. 3.

Figures 2, 4:
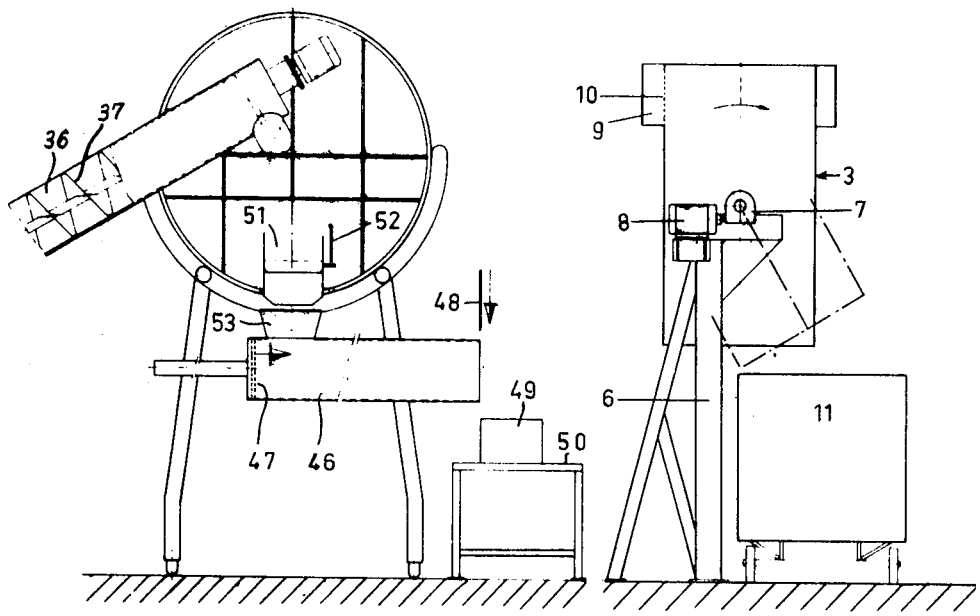
FIG. 4 is another embodiment of the right-hand end section shown in FIG. 3.

The device of the invention comprises a number of vessels 1 which serve for preparing the mass of curds. 2 represents discharge pipes capable of being connected to tanks 3. The tanks 3 may be subdivided—if desired— into compartments by partitions 4. By 5 and 6 posts are indicated on which bearing pedestals are disposed for supporting the pivots on which the tanks 3 are journalled. Two bearing pedestals with bearings 7 rest on the post 5, whereas each of the posts 6 bears one bearing pedestal with bearing 7. Driving means are represented by 8, e.g. an electric motor by which a pivot resting in the bearing 7 can be driven, that is to say, by which a tank 3 can be turned into any desired position.

9 is an overflow formed with an outlet in a no further detailed manner. 10 shows a sieve plate which separates the overflow from the inner space of the tank 3.

11 is a transport carriage, provided with wheels 12 whereas the ground surface is indicated by 13.

The carriage 11 is provided with grooves 14 in its vertical walls. These grooves serve for letting pass through them pins 15 for securing the lifting means 16, e.g. cables. The control of the lifting means is represented by 17. 18 is a loose bottom in the transport carrier 11, said bottom 18 fits in the open bottom side 19 of a cutting device to be specified later. Said cutting device is in the shape of a case with an open bottom which can be closed by the loose bottom 18 of a transport carriage 11 whereas inside the case a partition 22 is displaceable since it is coupled to a rod 23. The rod 23 is controlled from the outside by way of a guide 21 which is secured in the wall 20.

The wall 24 of the cutting device facing the wall 20 comprises as schematically shown in the drawing a knife grid. 25 shows a reciprocable knife or such like element which is movable downwards in the direction of the arrow. Said knife 25 may comprise, as shown in detail at the top of FIG. 3 at left, a number of knife blades 26. 27 is a cam disposed at the end of the knife 25. 28 shows an arm of the two-armed first-class lever which is rotatably supported at 29. 30 is the other arm of the lever which is connected to a rod 31. This rod 31 has formed on its end a slide 32 in the discharge 33 of a salt dosing or dispensing device 34. A drum or trough in which the cut and salted material can be collected is represented by 35.

36 shows a conveyor which in the present case is carried out as a spiral conveyor the worm of which is indicated by 37. 38 is the driving motor for the worm 37. 39 is the discharge which opens into a mixing drum 40. Said mixing drum is rotatably journalled by means of rollers 41. 42 are posts on which the mixing drum 40 rests. 43 is a weighing device whereas 44 represents cheese molds in which a previously weighed and treated mass of curds is received. 45 is a belt conveyor or the like by which the filled chessels 44 are delivered.

Instead of a conveyor 45 with tanks 44 disposed on it, also a pressing cylinder may be applied, as shown in FIG. 4. Said cylinder is indicated by 46 whereas 47 represents a plunger or the like. If desired, the cylinder 46 can be subjected to a vacuum for sucking off air. 48 is a knife which is movable in the direction of the arrow, 49 shows a chessel for holding a block of cheese, whereas 50 represents a conveyor by which the blocks or chessel 49 can be delivered.

The operation of the device of the invention is as follows: The mass of curds which has been pre-treated in the cheese tanks 1 together with the whey is transported to a tank 3 through pipes 2. Said tank 3 may be sub-divided into compartments by partitions. The heavier curds sink to the bottom of the tank 3 whereas the whey lands in the overflow 9. The separation of the curds and the whey is accomplished by the sieve plate 10. The superfluous whey is discharged in a manner not shown. After a tank is completely filled and the whey has substantially been removed from the mass, the connection of the pipe 2 is broken. A tank 3 can be turned in any desired position by means of the drive 8 whereas the whey yet to be pressed away can be discharged through the overflow 9. After a predetermined period of time the tank 3 is so positioned (see the position indicated in FIG. 2 in dotted lines) that the block of curds from which the whey is practically entirely extracted can glide into a transport carriage 11.

The transport carriage 11, containing a block of curds is now pushed under the cutting device, the cables 16 being slung round the pins 15, said pins 15 forming part of a loose bottom 18 which supports the block of curds. The cables 16 are pulled up by means of the lifting means 17 and in consequence thereof the loose bottom with the block of curds lying on it. Then this block of curds arrives in the cutting device, the loose bottom 18 fitting into the open side 19 of the cutting device to so form an all round closed cylinder.

Figure 3:
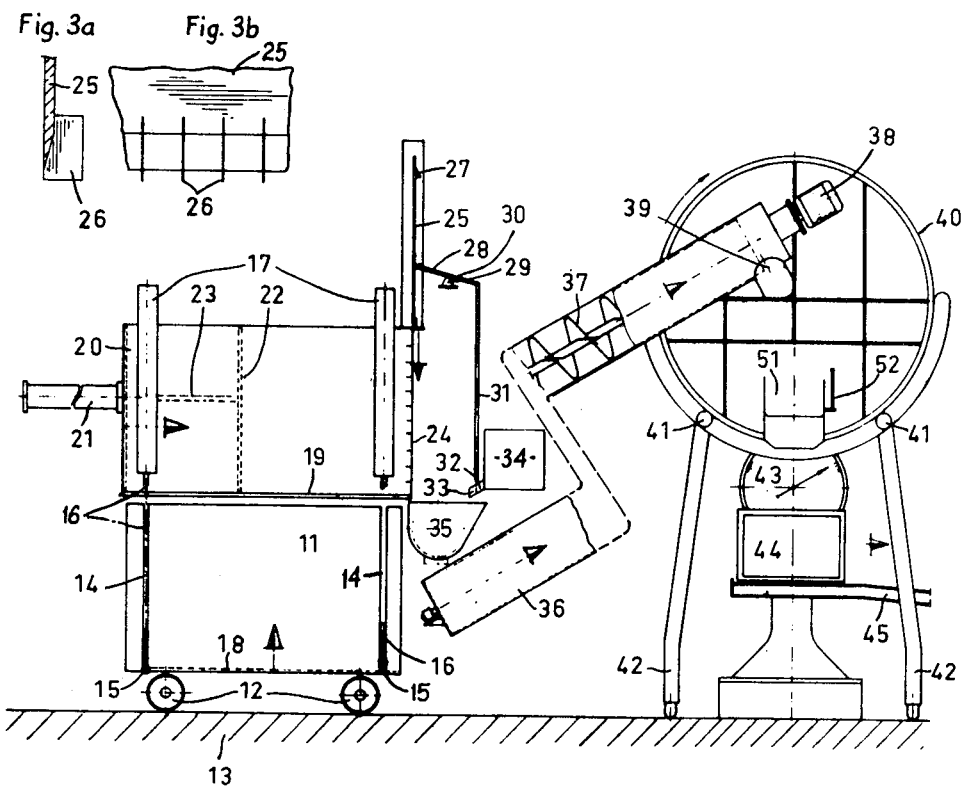
FIG. 3 shows another portion of the device of the invention including the carriage corresponding to that shown in FIG. 1.

By moving the partition 22 in the direction of the arrow the mass of curds is inherently compacted and pressed through the knife grid 24. Now, at predetermined times the knife 25 together with the knife blades 26 is moved downwards according to the direction of the arrow so as to produce chips of curds of determined lengths and diametrical dimensions. In lowering the knife 25 the cam 27 will contact the lever 28, causing the latter to rotate on the point 29 and the rod 30 to be raised, that is to say the slide 32 opens the discharge 33 of the salt dosing device 34. It is clear that the movement of the partition 22, that of the knife and the further related movements may be so programmed as to produce an automatic action. The cut and salted chips of curds are now collected in a trough 35 and led to the conveyor 36. Then the worm 37 of the conveyor leads the mass of curds into the mixing drum 40 wherein the final treatment takes place. By actuating a lever 52 the discharge 51 of the mixing drum 40 is opened so that a determined quantity of prepared mass of curds can be delivered. As shown in FIG. 3 this delivery takes place into a chessel 44, the contents at the same time being weighed out by the weighing device 43. Thereafter the chessel 44 is led through the conveyor 45 to a press and the curds are further finished in the usual way.

Another possibility is shown in FIG. 4. Therein the discharge 51 is opened by shifting the handle 52 as a result of which the mass of curds flows into the feeding hopper 43 of a pressing channel 46. The transport of the mass of curds inside the channel 46 is accomplished then by moving the slide of plunger 47 to the right (see the arrow in the drawing), so enabling the knife 48 to cut off blocks of a very specific shape and weight. Then these blocks arrive in the chessel 49 to be transported to the press in the usual manner by way of the conveyor 50 and for being submitted to a final treatment.

I claim:

1. A device for processing cheddar and other similar cheese, which device includes first tank means for making and second tank means for separating a whey and milk curd mixture, the improvement comprising in combination:
    (a) the tank means constituting the second tank means having means for selectively connecting it with said first tank means for receiving from the first tank means a mixture of whey-and-curds, said second tank means including means for first affecting separation of the whey-and-curds mixture, and also means including intermittently turning means for effecting cheddaring of the cheese within said same second tank means;
    (b) first conveying means for conveying the cheddared curds from said second tank means;
    (c) means operatively connecting said conveying means with means for first agglomerating or compacting and thence with grid-cutting means to cut the cheddared cheese curds into predetermined size pieces;
    (d) salt-dispensing means including a valve for salting said pieces, connected with and operated responsive to operation of said cutting means;
    (e) second conveying means to receive and convey the cut-and-salted pieces into rotary mixing tank means for further treatment and disposed apart from said first and second tank means;
    (f) means for discharging and forming said mixed and further treated cheddar pieces into predetermined size blocks for final processing or disposition; and
    (g) wherein said second tank means includes at least one tank mounted in a raised condition above said first conveying means on pivot means connected to opposite sides of the tank for facilitating rotation of said tank about a horizontal axis extending through said pivot means; and wherein the means of paragraph (a) for intermittently turning the second tank means includes automatic means for slowly rotating said tank in a generally vertical plane about the horizontal pivot means axis from a generally upright position through a travel arc of approximately 90° relative thereto.

2. A device as defined in claim 1 wherein the means for effecting separation of the whey and curds in paragraph (a) includes at least one overflow trough disposed on an upper fore-and-aft side of the tank which is disposed 90° relative to the pivot means side of the tank; and said trough being separated from the tank by a sieve plate.

3. A device for processing cheddar and other similar cheese, which device includes first tank means for making and second tank means for separating a whey-and-milk curd mixture, the improvement comprising in the combination:
    (a) the tank means constituting the second tank means having means for selectively connecting it with said first tank means for receiving from the first tank means a mixture of whey-and-curds, said second tank means including means for first affecting separation of the whey-and-curds mixture, and also means including intermittently turning means for effecting cheddaring of the cheese within said same second tank means;

(b) first conveying means for conveying the cheddared curds from said second tank means;

(c) means operatively connecting said conveying means with means for first agglomerating or compacting and thence with grid-cutting means to cut the cheddared cheese curds into predetermined size pieces;

(d) salt-dispensing means including a valve for salting said pieces, connected with and operated responsive to operation of said cutting means;

(e) second conveying means to receive and convey the cut-and-salted pieces into rotary mixing tank means for further treatment and disposed apart from said first and second tank means;

(f) means for discharging and forming said mixed and further treated cheddar pieces into predetermined size blocks for final processing or disposition;

(g) wherein said first conveying means of paragraph (b) include a mobile carriage movable between said second tank and said compacting means of paragraph (c), and having a raisable removable bottom wall and means associated therewith and with said compacting or agglomerating means for selectively lifting said bottom wall and cheese curds thereon into a receiving relation within an open bottomed compacting receptacle constituting part of said compacting or agglomerating means;

(h) said compacting receptacle having a movable compacting and extruding partition with means for reciprocably moving same from one end toward an opposite open end which ends are disposed 90° relative to the open bottom thereof; and (i) said grid-cutting means of paragraph (c) including a knife grid disposed across said open end of said compacting receptacle, and a reciprocable shearing knife operable to pass across said grid at predetermined times to cut the compacted cheese curds into predetermined sizes responsive to a combined compacting and extruding action by said movable partition.

4. A device as defined in claim 3 further including first-class lever means for operably interconnecting said shearing knife and said salt-dispensing means, including a medially fulcrumed lever having one end connected to said shearing knife and the opposite end connected with a reciprocable lever connected with the valve of the salt dispensing means, whereby downward shearing action of the knife raises said reciprocable valve-connected lever to open and dispense a predetermined amount of salt, and said valve is closed responsive to upward or return reciprocable movement of said knife.

References Cited

UNITED STATES PATENTS

| 2,717,212 | 9/1955 | Hensgen et al. | 99—116 |
| 2,868,651 | 1/1959 | Manwaring | 99—116 |
| 2,942,343 | 6/1960 | Söjholm et al. | 31—46 |
| 3,438,131 | 4/1969 | Ubbels et al. | 31—46 |
| 3,445,241 | 5/1969 | Pontecorvo et al. | 99—243 X |
| 3,468,026 | 9/1969 | Robertson et al. | 31—89 |

ALDRICH F. MEDBERY, Primary Examiner

U.S. Cl. X.R.

31—48